Dec. 24, 1929.  M. JAEGER  1,740,922
APPARATUS FOR DIGGING UP AND CONVEYING GROUND FROM BELOW THE SURFACE
Filed March 12, 1929   2 Sheets-Sheet 1
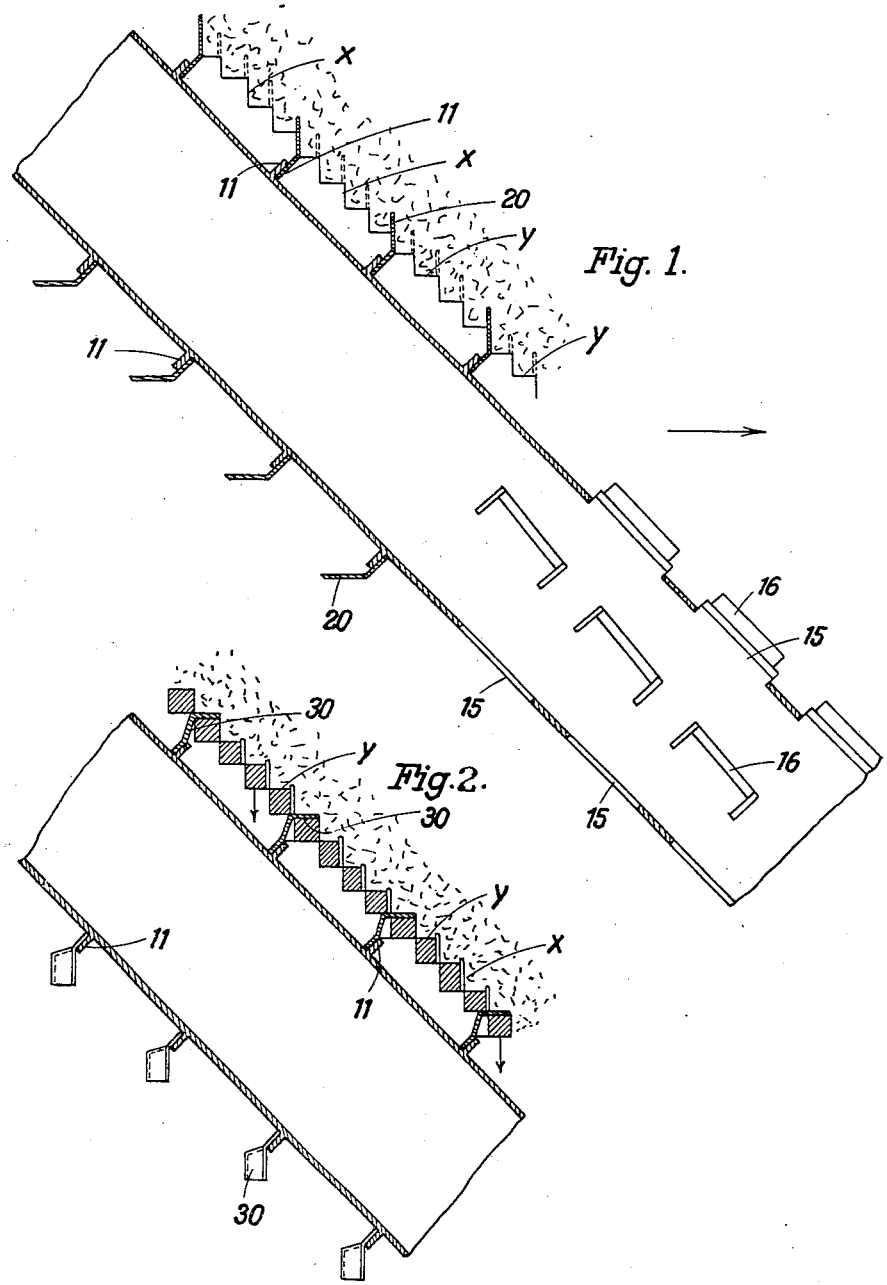

Dec. 24, 1929.  M. JAEGER  1,740,922
APPARATUS FOR DIGGING UP AND CONVEYING GROUND FROM BELOW THE SURFACE
Filed March 12, 1929   2 Sheets-Sheet 2

Inventor:
Max Jaeger
By
Wm. L. Symons
his attorney

Patented Dec. 24, 1929

1,740,922

UNITED STATES PATENT OFFICE

MAX JAEGER, OF WESSELBUREN, GERMANY, ASSIGNOR TO HEDWIG KRUEGER, OF WASHINGTON, DISTRICT OF COLUMBIA

APPARATUS FOR DIGGING UP AND CONVEYING GROUND FROM BELOW THE SURFACE

Application filed March 12, 1929, Serial No. 346,415, and in Germany October 26, 1928.

My invention relates to an apparatus for digging up ground from below the surface without removing the whole surface layer.

An important object of my invention is to save labor for digging and conveying and to this end I employ a tubular conveyor which is moved in the ground at an angle to the horizontal and is provided in its interior with a conveyor screw, on its outer surface with a digging device cutting a way through the surface layers and at its lower end with an excavator by means of which the cut off material is conveyed into the tube to be raised by the conveyor screw.

My present invention relates to a device of the kind disclosed in my prior Patent 1,701,678 of February 12, 1929 and is an improvement thereon. The present invention is directed to an improved excavating apparatus for use on the device covered by my prior patent referred to.

In the preferred embodiment of my invention I provide a particular form of digging device and excavator which are especially suitable for the purpose in view.

In the drawings affixed to this specification and forming a part thereof, a device embodying my invention is illustrated diagrammatically by way of example.

In the drawings,

Figure 1 is a longitudinal sectional view of my improved excavator tube,

Figure 2 is a similar view showing the tube in a different position,

Figure 3:
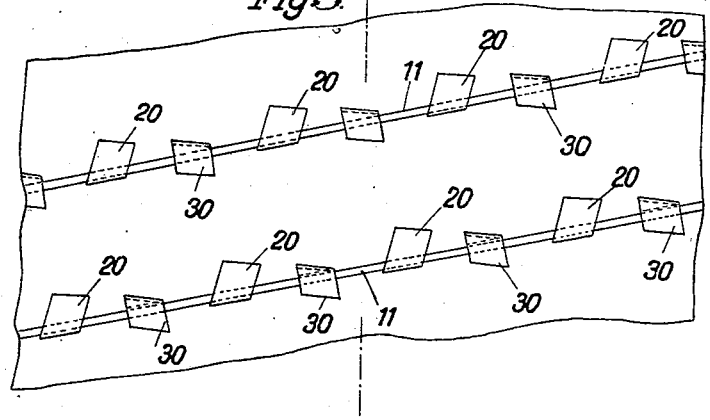
Figure 3 is a development of the conveyor tube wall.
Figure 4:
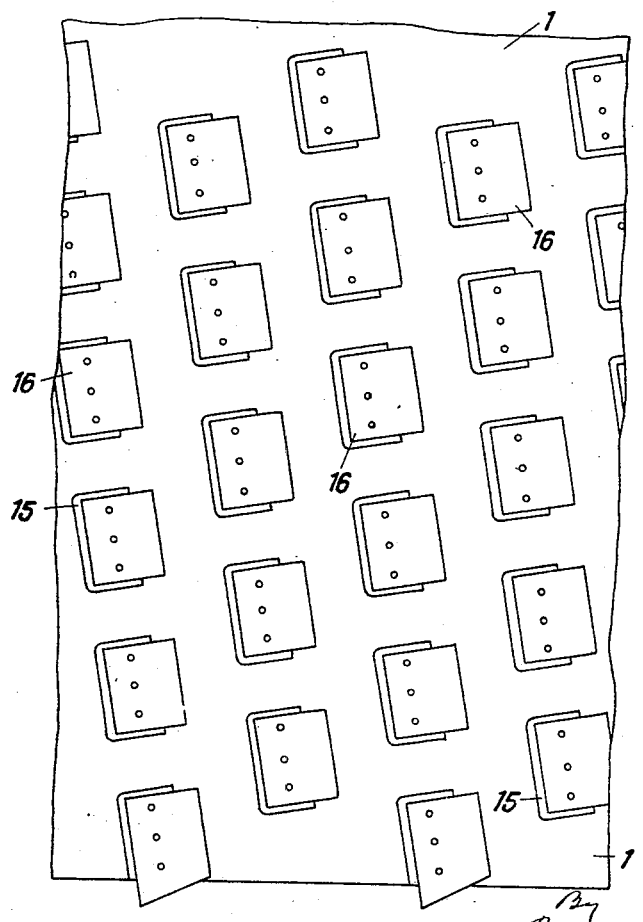
Figure 4 is a development of the excavator wall.

Referring to the drawings, 1 is a conveying tube provided on its outer wall with a spirally arranged screw cutter, and an excavator is arranged on its lower end. A screw conveyor (not shown) is adapted to be arranged within the conveying tube for rotation. This device is forced or pulled through the ground in the position shown in the drawings, by means of a tractor (not shown) or by some other suitable means, which also causes it to continually rotate about its longitudinal axis in the manner described in my patent referred to above.

The external screw cutter comprises a spirally arranged ring 11 which encircles the tube 1 and from which project suitable cutters 20 and 30 spaced so as to leave gaps between them. The cutters 20 and 30 are arranged alternately on the ring 11. The cutters 20 are shaped and positioned on the screw 11 in such manner that they merely perform a preliminary cut, the width of which is equal to the size of the blade as shown at $x$ in Figure 1, and may move freely through the ground while the tube is advancing without thrust being put upon the blades. As shown in Figure 1 in which only the cutters 20 are illustrated, they extend substantially vertically in their highest position, and substantially horizontally in their lowest position. As shown in Figure 2, the second type of cutters 30 which alternate with the cutters 20, have cutting edges which are so positioned that they perform a cut $y$ substantially at right angles to the cut $x$, and cut out the hatched squares in Figure 2. Also, these cutters are bent to the rear of the cutting edges into the shape of small shovels to push aside the cut out material and deposit it to the rear of the conveying tube in the course of its rotary movement. The cut out material drops off the back of the shovel shaped cutters.

As shown in the development illustrated in Figure 3 the two kinds of cutters 20 and 30 project alternately in opposite directions from the narrow screw ring 11.

The excavator at the lower end of the tube 1 comprises openings or slots 15 arranged spirally about the periphery of the tube. On the cutting edges of these slots 15, cutting blades 16 are mounted.

When the device above described is forced through the ground in the direction of the arrows in Figure 1, rotating about its longitudinal axis, the cutters 20 and 30 on the exterior of the tube, which are spirally arranged, will cut out the soil from in front of the tube and pass it to the rear thereof, through a substantially horizontal plane. The spaces between the cutters 20 and 30 allow the loosened soil to drop through without being carried upwardly by the spiral cutter. This action of the cutters makes a path for the tube without moving the loosened soil to the surface, or in fact, without substantially displacing it vertically.

The cutters 16 dig up the soil in the stratum to be removed, and pass it through the openings 15 to the screw conveyor in the tube (not shown) which carries the soil to the surface of the ground. It will be seen that this operation removes the lower stratum of soil without removing the strata of soil thereabove.

While I have shown and described the preferred embodiment of my invention, it is to be understood that the size, shape and arrangement of parts may be resorted to without departing from the spirit of my invention or the scope of the subjoined claims.

I claim :—

1. Device for digging up ground from below the surface comprising a cutting tube, two kinds of cutters inclined to opposite sides mounted on said tube in a helical line in spaced relation, an excavator at the lower end of said tube and means within said tube for conveying the material cut off by said excavator upwardly in axial direction.

2. Device for digging up ground from below the surface comprising a cutting tube, two kinds of cutters secured to said tube in a spiral line and in spaced relation, an upwardly bent cutter alternating with a downwardly bent cutter, an excavator at the lower end of said tube having longitudinal slots arranged in a spiral line, cutting blades associated with said slots and a conveyer screw rotatably mounted within said tube and said excavator.

3. A device for digging up ground from below its surface comprising a rotating conveyor tube, and a helical cutting element encircling said tube and extending longitudinally thereof, said helical cutting element comprising cutting blades extending in opposite directions.

4. A device of the character described comprising a rotating conveyor tube, and a helical cutting element encrcling said tube and extending longitudinally thereof, said helical cutting element comprising upwardly inclined cutting blades alternating with downwardly inclined cutter blades.

5. A device of the character described comprising a rotating conveyor tube, a helical cutter rim encircling said tube and extending longitudinally thereof, and spaced cutter blades secured to said helical rim, alternate blades being inclined in opposite directions.

6. A device of the character described comprising a rotating conveyor tube, a cutter arranged adjacent the end of the conveyor tube and adapted to loosen the soil at a point spaced from the surface of the ground, means in said tube for conveying the loosened soil to the surface of the ground, and cutting means arranged on the conveyor tube and adapted to move the soil from in front of the tube to the rear thereof substantially without displacing it longitudinally of the tube, said cutting means comprising spaced inclined cutting blades, alternate blades being oppositely inclined.

7. A device for digging up soil from below its surface, comprising a rotating conveyor tube, a cutter arranged adjacent the end of the conveyor tube and adapted to loosen the soil at a point spaced from the surface of the ground, and cutting means arranged on the conveyor tube and adapted to move the soil from in front of the tube to the rear thereof, said cutting means comprising a spiral series of spaced cutting blades, alternate blades being inclined in opposite directions.

8. A device for digging up soil from below its surface comprising a rotating conveyor tube, a cutter arranged adjacent the end of the conveyor tube and adapted to loosen the soil at a point spaced from the surface of the ground, and cutting means arranged on the conveyor tube and adapted to move the soil from in front of the tube to the rear thereof, said cutting means comprising a helical cutter rim encircling said tube, and spaced cutter blades secured to said rim, alternate blades being inclined in opposite directions.

In testimony whereof I affix my signature.

MAX JAEGER.